United States Patent
Owen et al.

(10) Patent No.: US 7,596,622 B2
(45) Date of Patent: Sep. 29, 2009

(54) APPARATUS AND METHOD FOR PROCESSING WEB SERVICE DESCRIPTIONS

(75) Inventors: Russell Norman Owen, Waterloo (CA); David Paul Yach, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 992 days.

(21) Appl. No.: 10/786,004

(22) Filed: Feb. 26, 2004

(65) Prior Publication Data

US 2005/0193135 A1 Sep. 1, 2005

(51) Int. Cl.
  G06F 15/16 (2006.01)
  G06F 15/173 (2006.01)
  G06F 15/177 (2006.01)
  G06F 7/00 (2006.01)
  H04L 12/66 (2006.01)
  G06F 17/00 (2006.01)

(52) U.S. Cl. .................. 709/230; 709/220; 709/223; 707/100; 715/230; 370/352

(58) Field of Classification Search .............. 709/203, 709/230; 715/230; 370/352; 707/100
See application file for complete search history.

(56) References Cited

U.S. PATENT DOCUMENTS

| 6,732,167 | B1 * | 5/2004 | Swartz et al. ................ 709/223 |
| 6,934,756 | B2 * | 8/2005 | Maes ........................ 709/227 |
| 7,349,949 | B1 * | 3/2008 | Connor et al. ............... 709/217 |
| 2002/0173986 | A1 * | 11/2002 | Lehew et al. ................ 705/1 |
| 2002/0174178 | A1 * | 11/2002 | Stawikowski ............... 709/203 |
| 2003/0095540 | A1 | 5/2003 | Mulligan et al. |
| 2004/0015564 | A1 * | 1/2004 | Williams ................... 709/219 |
| 2004/0093580 | A1 * | 5/2004 | Carson et al. ............... 717/101 |
| 2004/0148334 | A1 * | 7/2004 | Arellano et al. ............ 709/201 |
| 2004/0199614 | A1 * | 10/2004 | Shenfield et al. ........... 709/220 |
| 2004/0215824 | A1 * | 10/2004 | Payrits ..................... 709/245 |
| 2005/0038867 | A1 * | 2/2005 | Henderson et al. ......... 709/217 |
| 2005/0044197 | A1 * | 2/2005 | Lai ......................... 709/223 |
| 2005/0071448 | A1 * | 3/2005 | Katz et al. ................. 709/223 |
| 2005/0086330 | A1 * | 4/2005 | Perham et al. .............. 709/220 |
| 2005/0086360 | A1 * | 4/2005 | Mamou et al. ............. 709/232 |
| 2006/0036682 | A1 * | 2/2006 | Fletcher et al. ............ 709/203 |

OTHER PUBLICATIONS

Christensen, Erik et al., "Web Services Description Language (WSDL) 1.0" IBM.COM, Sep. 25, 2000.
EXPWAY: "Bin-XML in Ten Points" [Online] 2003, Retrieved from the Internet: URL:http://www.expway.com/index.php?rubr=prod&page=4> [retrieved on Jul. 27, 2004].

(Continued)

Primary Examiner—William C Vaughn, Jr.
Assistant Examiner—Muktesh G Gupta
(74) Attorney, Agent, or Firm—Bereskin & Parr LLP/S.E.N.C.R.L., s.r.l.

(57) ABSTRACT

An apparatus and method for processing a web service description such that the web service description is adapted for use with mobile devices. A web services accelerator is adapted to receive a web service description that defines an interface to a web service, create at least one accelerator output file from the web service description, and transmit the at least one accelerator output file to a mobile device. Accelerator output files are used by the mobile device to invoke web services.

44 Claims, 8 Drawing Sheets

OTHER PUBLICATIONS

Harrison, Warren, "Using Service Specific Proxies to Migrate Web Services to the "Wireless Web": an Illustrative Case Study of Adaptive Maintenance", Proceedings IEEE International Conference on Software Maintenance, Los Alamitos, CA: IEEE Comp. Soc, US, Oct. 3, 2002, pp. 300-309.

Pilioura, T. et al., "Scenarios of using Web Services in M-Commerce", ACM Sigecom Exchanges, [Online], vol. 3, No. 4, Jan. 2003, pp. 28-36.

PCT Written Opinion for International Application No. PCT/GB2005/050026 dated Apr. 26, 2005.

PCT International Search Report for International Application No. PCT/GB2005/050026 dated Apr. 26, 2005.

European Search Report. Application No. 04251098.2. Dated: Nov. 28, 2006.

Bos, Bert (modified by Liam Quin), "The XML Data Model", Apr. 27, 1997, pp. 1-6, http://www.w3.org/XML/Datamodel.html.

Guo, Ping et al., "Parsing XML Efficiently", Sep./Oct. 2003, Oracle Technology Network, http://www.oracle.com/technology/oramag/oracle/03-sep/o53devxml.html.

Chinese Office Action (English translation). Application No. 200580012237.0. Dated: Dec. 28, 2007.

European Communication Under Rule 71(3) EPC. Application No. 04251098.2. Dated: Apr. 18, 2008.

Chinese Second Office Action (English translation). Application No. 200580012237.0. Dated: Jul. 18, 2008.

Chinese third Office Action (English translation). Application No. 200580012237.0. Dated: Oct. 10, 2008.

* cited by examiner

APPARATUS AND METHOD FOR PROCESSING WEB SERVICE DESCRIPTIONS

FIELD OF THE INVENTION

Embodiments of the invention relate generally to web services, and more specifically to the application of web services to mobile devices.

BACKGROUND OF THE INVENTION

A web service can be generally defined as one or more application functions that can be invoked over the Internet using a protocol. One example of a protocol that may be used in this context is the Simple Object Access Protocol (SOAP), which may be used by Internet-based application servers, also known as web servers, to provide web services. SOAP is a protocol that is often used in the exchange of information in decentralized, distributed network environments.

One goal of web services is to use the infrastructure of the web to provide information that is machine-readable. Unlike traditional client/server models such as a web server/web page system, web services do not typically provide the user with a graphical user interface (GUI), but instead share business logic, data, and processes through a programmatic interface across a network. As applications are capable of interfacing with web services, developers may add web services to a GUI (e.g. a web page or executable program) to offer specific functionality to users.

Furthermore, different applications from different sources can communicate with each other without extensive custom coding, and web services are not associated with any one operating system or programming languages. This flexibility allows more sophisticated business-to-business applications as well as more sophisticated browsing models (with more client-side processing of data) to be developed.

However, despite an increase in popularity of the web services model, attempts to adapt the model specifically for use in the field of wireless communications and by mobile devices have been relatively limited. Given the various constraints that may be particular to mobile devices (e.g. limited memory, increased bandwidth costs, etc.), there is a need to enhance the standard web services paradigm in a manner that better accounts for these constraints while preserving many of the advantages associated with web services.

SUMMARY OF THE INVENTION

Embodiments of the invention relate generally to web services, and more specifically to the application of web services to mobile devices.

In one broad aspect of the invention, there is provided a web services accelerator programmed to: receive a web service description that defines an interface to a web service, create at least one accelerator output file adapted for processing by a mobile device from the web service description, and transmit the at least one accelerator output file to the mobile device. The at least one accelerator output file facilitates invocations of the web service by the mobile device.

The web services accelerator may reside on a computing device remotely coupled to the mobile device in a network. Tasks related to the processing of a web service description by the web services accelerator, and other tasks including, for example, those relating to invocations of web services, may be performed on the remote computing device in order to reduce the processing load on the mobile device.

In one embodiment of the invention, the at least one accelerator output file represents a version of the web service description that has been optimized for processing by the mobile device. Typically, the optimized web service description will be more compact in size, and can be more efficiently transmitted to and subsequently processed by the mobile device.

In another embodiment of the invention, a subset of elements in the web service description is sent to the device. This subset is the minimal amount of information required to describe the parameters of the web service. Information required to invoke the web service, such as location and method, are stored in the web services accelerator. Parameter information received from the mobile device is passed back to the web services accelerator and recombined with the invocation information. This technique typically reduces the amount of information that is required to be transferred to and from the mobile device.

In another embodiment of the invention, the at least one accelerator output file represents executable code for the mobile device. The code comprises instructions for obtaining input data, typically from a user of the mobile device, which is then used to invoke the web service. In this embodiment, client applications programmed to process web service descriptions for web services are not required for execution on the mobile device itself.

BRIEF DESCRIPTION OF THE DRAWINGS

These and other features of embodiments of the invention will be made apparent from the following description, with reference to the accompanying drawings, in which.

DETAILED DESCRIPTION OF EMBODIMENTS OF THE INVENTION

Figure 1:
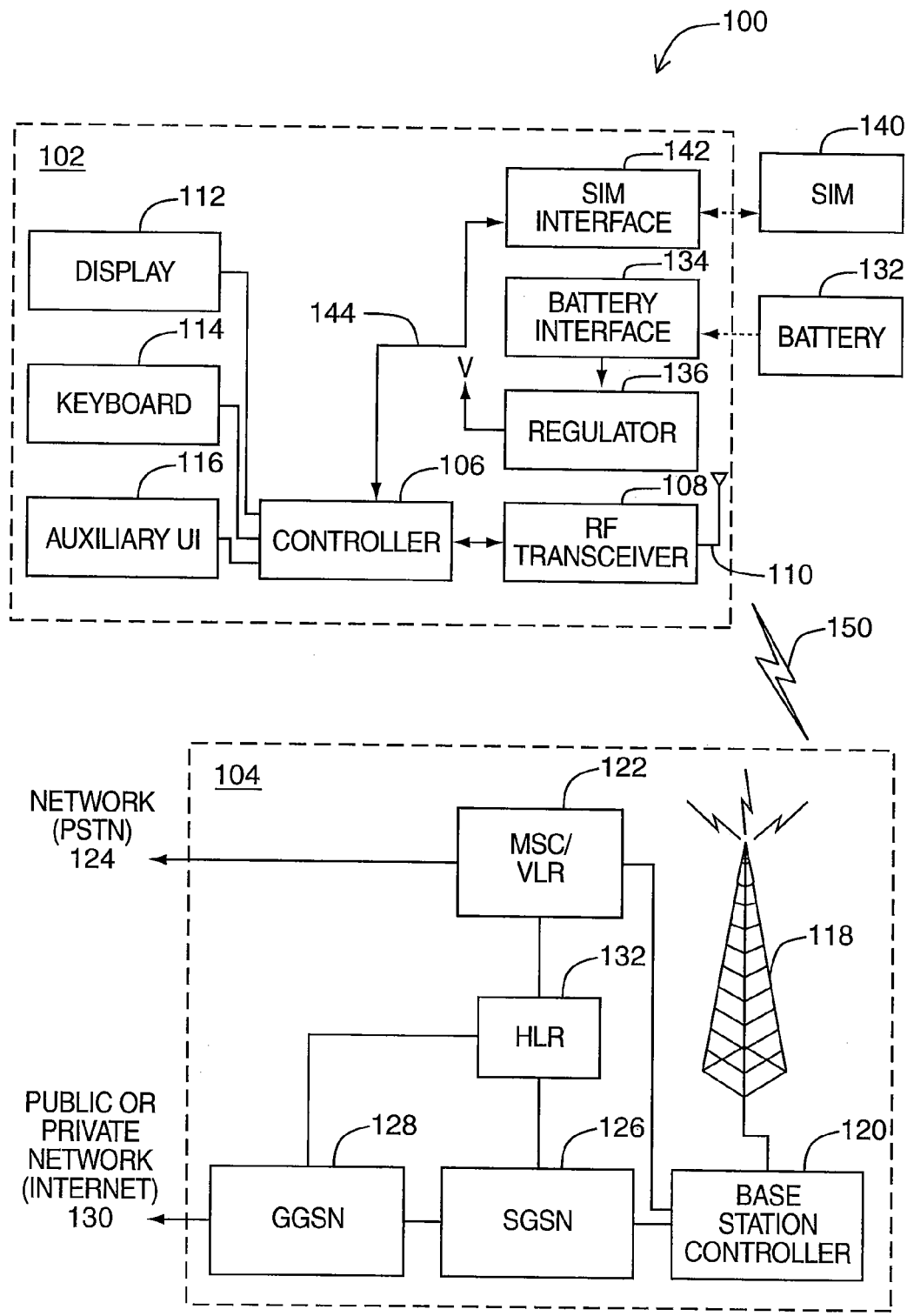
FIG. 1 is a block diagram which illustrates components of a mobile device which communicates within a wireless communication network.

FIG. 1 is a block diagram of a communication system 100, which includes a mobile device 102 that communicates through a wireless communication network 104. Mobile device 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU), which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions such as modulation/demodulation and possibly encoding/decoding and encryption/decryption. It will be apparent to those skilled in art that RF transceiver circuitry 108 will be adapted to particular wireless network or networks in which mobile device 102 is intended to operate.

Mobile device 102 includes a battery interface 134 for receiving one or more rechargeable batteries 132. Battery 132 provides electrical power to electrical circuitry in mobile device 102, and battery interface 132 provides for a mechanical and electrical connection for battery 132. Battery interface 132 is coupled to a regulator 136, which regulates power to the device. When mobile device 102 is fully operational, an RF transmitter of RF transceiver circuitry 108 is typically keyed or turned on only when it is sending to a network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 operates using a Subscriber Identity Module (SIM) 140 which is connected to or inserted in mobile device 102 at a SIM interface 142. SIM 140 is one type of a conventional "smart card" used to identify an end user (or subscriber) of mobile device 102 and to personalize the device, among other things. Without SIM 140, the mobile device terminal is not fully operational for communication through wireless network 104. By inserting SIM 140 into mobile device 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile device. SIM 140 may store additional user information for the mobile device as well, including datebook (or calendar) information and recent call information.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 118. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

The wireless link 150 of FIG. 1 represents one or more different channels, typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in art will appreciate that a wireless network in actual practice may include hundreds of cells, each served by a station 118 (or station sector), depending upon desired overall expanse of network coverage. All pertinent components may be connected by multiple switches and routers (not shown), controlled by multiple network controllers.

For all mobile devices 102 registered with a network operator, permanent data (such as mobile device 102 user's profile) as well as temporary data (such as mobile device's 102 current location) are stored in HLR 132. In case of a voice call to mobile device 102, HLR 132 is queried to determine the current location of mobile device 102. A Visitor Location Register (VLR) of MSC 122 is responsible for a group of location areas and stores the data of those mobile devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile device 102 or by the fixed transceiver equipment instructing mobile device 102 to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming GPRS data, or SMS messages over GPRS. In order to send and receive GPRS data, mobile device 102 assists in activating the packet data address that it wants to use. This operation makes mobile device 102 known to GGSN 128; interworking with external data networks can thereafter commence. User data may be transferred transparently between mobile device 102 and the external data networks using, for example, encapsulation and tunneling. Data packets are equipped with GPRS-specific protocol information and transferred between mobile device 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
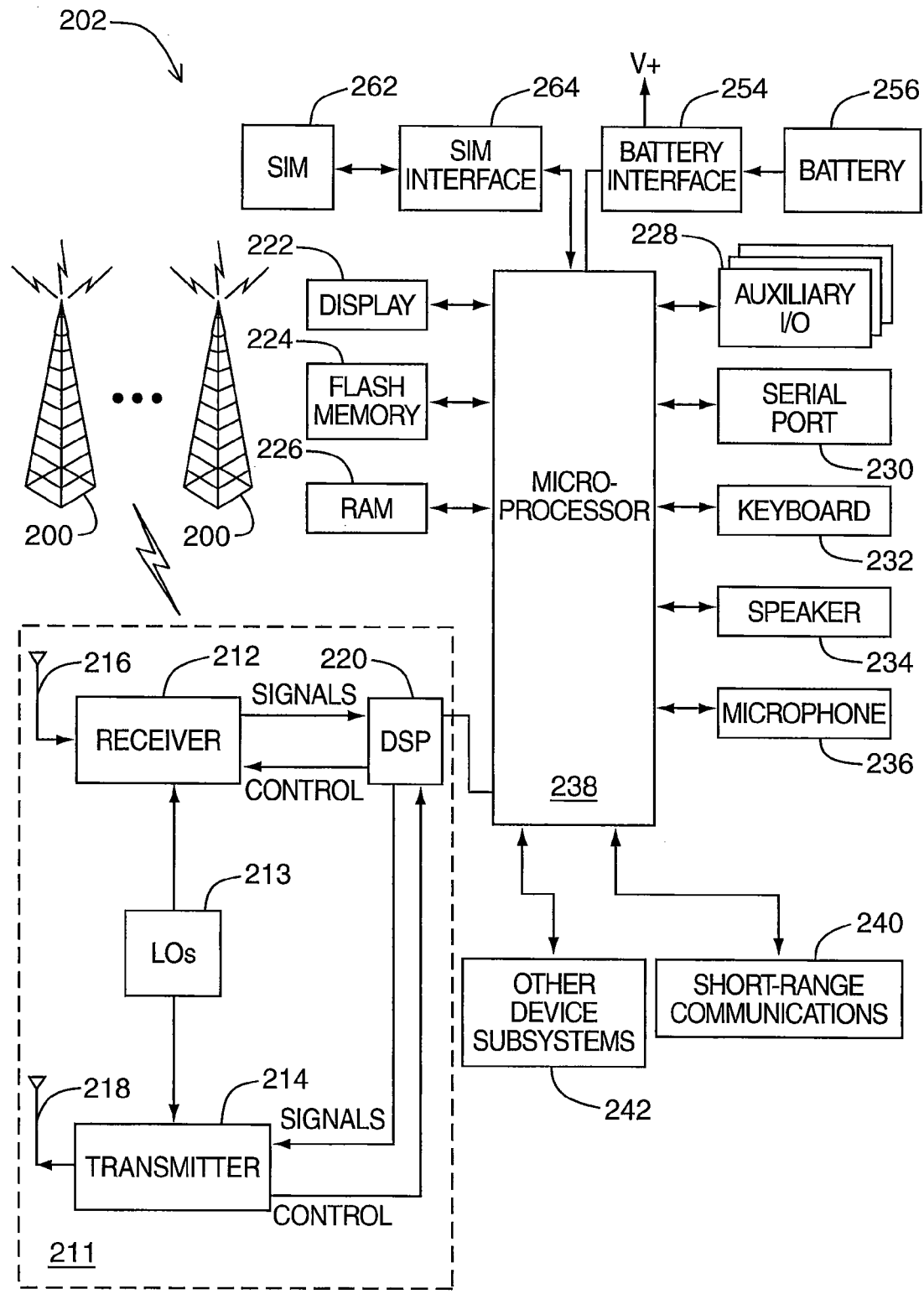
FIG. 2 is a schematic diagram illustrating components of the mobile device of FIG. 1.

FIG. 2 is a detailed block diagram of a mobile device 202 (e.g. mobile device 102 of FIG. 1). Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of fixed transceiver stations 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 requires a Subscriber Identity Module or "SIM" card 262 to be inserted in a SIM interface 264 in order to operate in the network. SIM 262 includes those features described in relation to FIG. 1. Mobile device 202 is a battery-powered device so it also includes a battery interface 254 for receiving one or more rechargeable batteries 256. Such a battery 256 provides electrical power to most, if not all electrical circuitry in mobile device 202, and battery interface 254 provides for a mechanical and electrical connection for it. The battery interface 254 is coupled to a regulator (not shown), which provides power V+ to all of the circuitry.

Mobile device 202 includes a microprocessor 238 (which is one implementation of controller 106 of FIG. 1), which controls overall operation of mobile device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications (such as a network reestablishment scheme), will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system thereby creating a mirrored host computer on mobile device 202 with respect to such items. This is especially advantageous where the host computer system is the mobile device user's office computer system. Additional applications may also be loaded onto mobile device 202 through the communications network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional optional component which provides for communication between mobile device 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
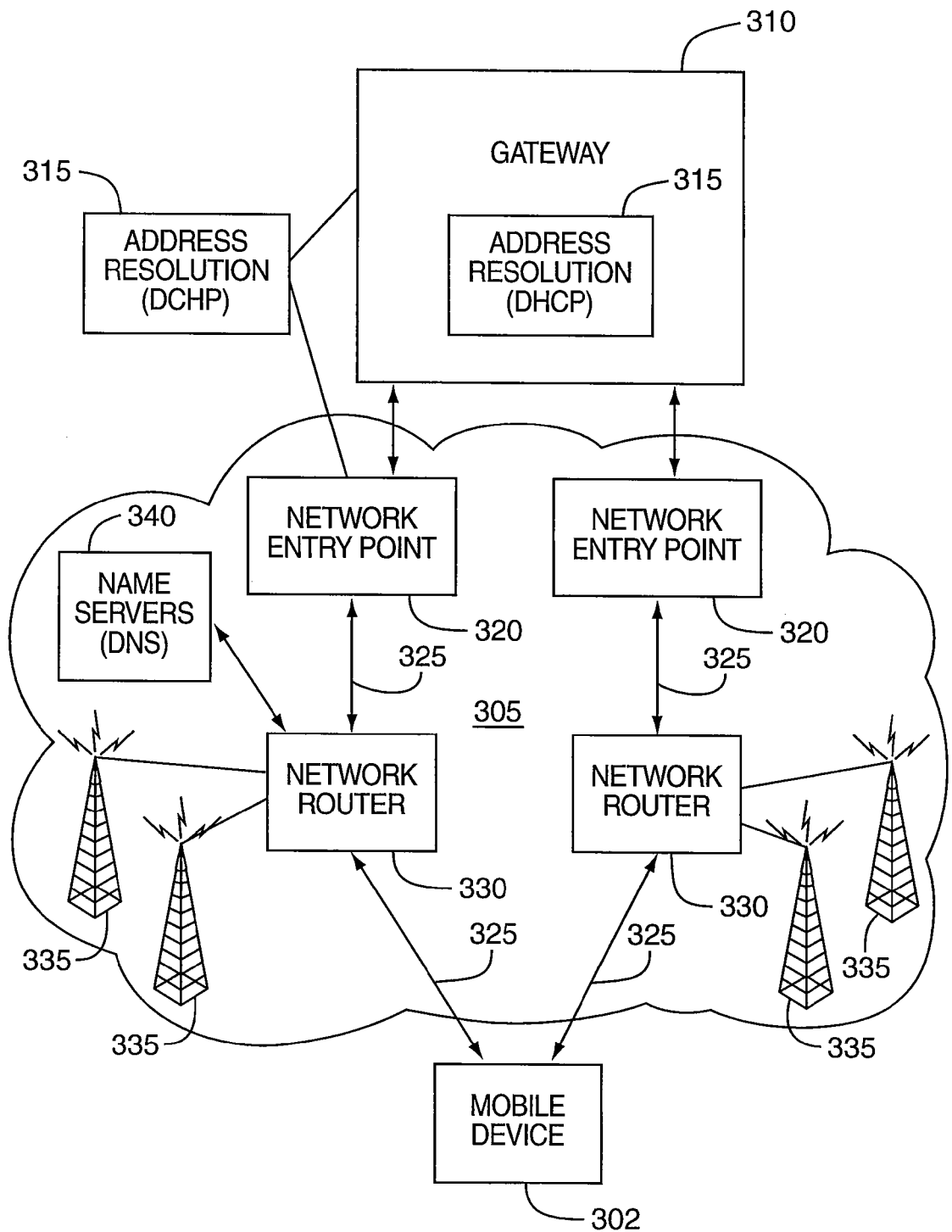
FIG. 3 is a particular structure of a system for communication with the mobile device.

FIG. 3 shows an example system structure for communicating with a mobile device. In particular, FIG. 3 shows basic components of one example of an IP-based wireless data network which may be utilized. Mobile device 302 (e.g. mobile device 102 and 202 of FIG. 1 and FIG. 2 respectively) communicates with a wireless packet data network 305, and may also be capable of communicating with a wireless voice network (not shown). As shown in FIG. 3, a gateway 310 may be coupled to an internal or external address resolution component 315 and one or more network entry points 320. Data packets are transmitted from gateway 310, which is a source of information to be transmitted to mobile device 302, through network 305 by setting up a wireless network tunnel 325 from gateway 310 to mobile device 302. In order to create this wireless tunnel 325, a unique network address is associated with mobile device 302. In an IP-based wireless network, however, network addresses are typically not permanently assigned to a particular mobile device 302 but instead are dynamically allocated on an as-needed basis. It is thus preferable for mobile device 302 to acquire a network address and for gateway 310 to determine this address so as to establish wireless tunnel 325.

Network entry point 320 is generally used to multiplex and demultiplex amongst many gateways, corporate servers, and bulk connections such as the Internet, for example. There are normally very few of these network entry points 320, since they are also intended to centralize externally available wireless network services. Network entry points 320 often use some form of an address resolution component 315 that assists in address assignment and lookup between gateways and mobile devices. In this example, address resolution component 315 is shown as a dynamic host configuration protocol (DHCP) as one method for providing an address resolution mechanism.

A central internal component of wireless data network 305 is a network router 330. Normally, network routers 330 are proprietary to the particular network, but they could alternatively be constructed from standard commercially available hardware. The purpose of network routers 330 is to centralize thousands of fixed transceiver stations 335 normally implemented in a relatively large network into a central location for a long-haul connection back to network entry point 320. In some networks there may be multiple tiers of network routers 330 and cases where there are master and slave network routers 330, but in all such cases the functions are similar. Often a network router 330 will access a name server 340, in this case shown as a dynamic name server (DNS) 340 as used in the Internet, to look up destinations for routing data messages. Fixed transceiver stations 335, as described above, provide wireless links to mobile devices such as mobile device 302.

Wireless network tunnels such as a wireless tunnel 325 are opened across wireless network 305 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile device 302 must use a specific technique associated with wireless network 305. The step of opening such a wireless tunnel 325 may require mobile device 302 to indicate the domain, or network entry point 320 with which it wishes to open wireless tunnel 325. In this example, the tunnel first reaches network router 330 which uses name server 340 to determine which network entry point 320 matches the domain provided. Multiple wireless tunnels can be opened from one mobile device 302 for redundancy, or to access different gateways and services on the network. Once the domain name is found, the tunnel is then extended to network entry point 320 and necessary resources are allocated at each of the nodes along the way. Network entry point 320 then uses the address resolution component 315 to allocate an IP address for mobile device 302. When an IP address has been allocated to mobile device 302 and communicated to gateway 310, information can then be forwarded from gateway 310 to mobile device 302.

Wireless tunnel 325 typically has a limited life, depending on mobile device's 302 coverage profile and activity. Wireless network 305 will tear down wireless tunnel 325 after a certain period of inactivity or out-of-coverage period, in order to recapture resources held by this wireless tunnel 325 for other users. The main reason for this is to reclaim the IP address temporarily reserved for mobile device 302 when wireless tunnel 325 was first opened. Once the IP address is lost and wireless tunnel 325 is torn down, gateway 310 loses all ability to initiate IP data packets to mobile device 302, whether over Transmission Control Protocol (TCP) or over User Datagram Protocol (UDP).

Figure 4A:
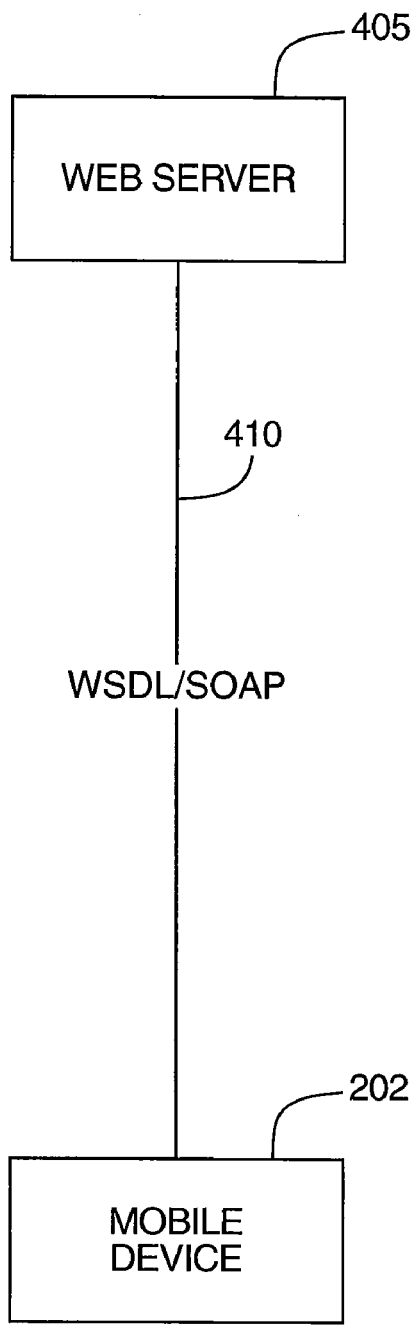
FIG. 4A is a schematic diagram that illustrates a mobile device connected to a web server over a connection in a wireless communication network.

Referring to FIG. 4A, there is shown a schematic diagram that illustrates a mobile device 202 connected to a web server 405 over a connection 410 in a wireless data network (e.g. wireless network 305 of FIG. 3). Web server 405 is a provider of web services. Generally, web services are self-contained, self-describing modular applications that can be deployed (i.e. published), located, and invoked across the World Wide Web (the "Web"). Other applications, including other web services, can discover deployed web services and invoke them.

A basic web service platform may be based on the Extensible Markup Language (XML) and the Hyper Text Transfer Protocol (HTTP). XML provides a metalanguage in which specialized languages may be written to express complex interactions between clients and services, or between components of a composite service. Web server 405 will typically convert XML messages into a middleware request, and convert results back into XML.

This basic platform is augmented with several other platform services to constitute a more functional platform. A fully-functional web services platform further consists of three additional elements: the Simple Object Access Protocol (SOAP), the Universal Description, Discovery and Integration Service (UDDI) [not shown], and the Web Services Description Language (WSDL).

SOAP is a protocol specification that defines a uniform way of passing data as an XML message. SOAP can be synchronous (e.g. a remote procedure call) or asynchronous (e.g. a message). In particular, SOAP is one example of a protocol that may be used to encode the information in web service requests and response messages before they are sent over a network.

UDDI is used for listing what web services are available, and provides a mechanism for clients to dynamically find specific web services. It is a Web-based distributed directory that enables web service publishers (who have information or services to share) to register themselves, and for clients or web service consumers (who want information or services) to search these registries. When an appropriate web service has been found, a description of this service may be retrieved.

WSDL is a way to describe a web service. More specifically, WSDL provides a way for web service providers to describe the basic format of web service requests over different protocols or encodings. WSDL is an XML description of a web service, which describes what the web service can do, where it resides, and how to invoke it.

In one embodiment of the invention, a web service description is embodied in a WSDL file. WSDL files include all the information needed to use a web service including the format of the message web server 405 is expecting, and the location of web server 405 on a network. Furthermore, WSDL files can be converted into code which will invoke a web service.

WSDL defines services as collections of network communication endpoints or ports capable of exchanging messages. In WSDL, the abstract definition of endpoints and messages is separated from their concrete network deployment or data format bindings. This allows the reuse of abstract definitions of messages, which are abstract descriptions of the data being exchanged, and port types, which are abstract collections of operations. The concrete protocol and data format specifications for a particular port type constitute a reusable binding. A port is defined by associating a network address with a reusable binding, and a collection of ports defines a service. Accordingly, a WSDL document uses the following elements (also referred to herein as web service description elements):

Types:
    a container for data type definitions using some type system (e.g. XML Schema Definition or XSD);

Message:
    an abstract, typed definition of the data being communicated;

Operation:
    an abstract description of an action supported by the service;

Port Type:
    an abstract set of operations supported by one or more endpoints;

Binding:
    a concrete protocol and data format specification for a particular port type;

Port:
    a single endpoint defined as a combination of a binding and a network address; and Service:
    a collection of related endpoints.

While other protocols and message formats may be used to communicate with a web service (e.g. HTTP GET/POST, Multipurpose Internet Mail Extensions or MIME), an embodiment of the invention will now be described in further detail herein assuming that SOAP is used as the invocation protocol for communications between mobile device 202 and web server 405.

Web service protocols and formats such as WSDL and SOAP were not initially designed for specific adaptation to wireless communication between web services and mobile devices. As a result, web service descriptions, which may be in the form of WSDL files for example, tend to be relatively verbose. In order to preserve bandwidth and more efficiently support web services on mobile devices, a web services accelerator may be used in accordance with an embodiment of the invention.

Figure 4B:
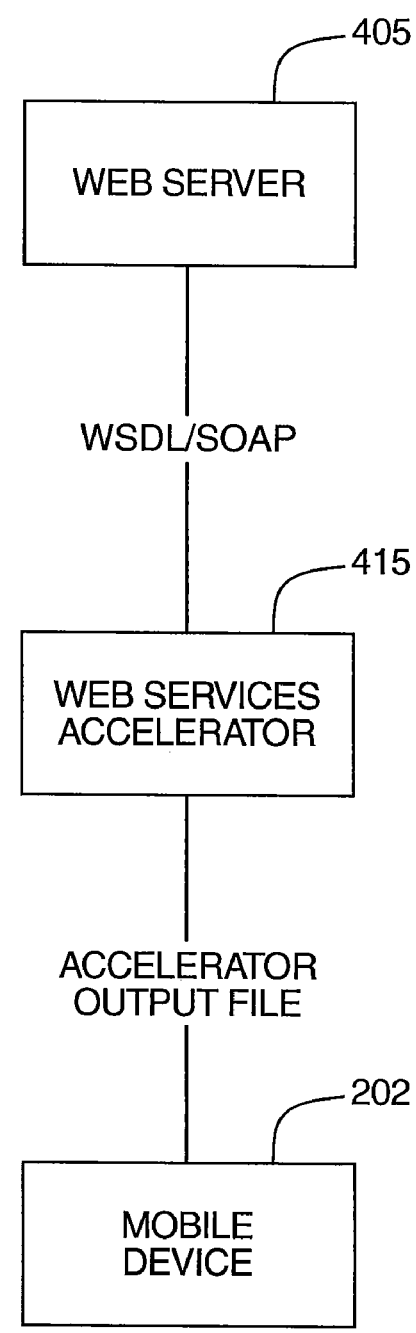
FIG. 4B is a schematic diagram illustrating a web services accelerator connected to the web server and the mobile device of FIG. 4A.

Referring to FIG. 4B, a web services accelerator 415 is shown. Web services accelerator 415 communicates with web server 405 and with mobile device 202. In one embodiment of the invention, web services accelerator 415 is provided on a server which acts as a gateway (e.g. gateway 310 of FIG. 3) between web server 405 residing in a network (e.g. wireless network 305 of FIG. 3) and mobile device 202. In variant embodiments of the invention, web services accelerator 415 may reside on a different computing device or elsewhere in the network, including web server 405 itself, for example.

Web services accelerator 415 outputs one or more files to mobile device 202 for further processing. These files may then be used by mobile device 202 to invoke one or more desired web services.

Figure 5:
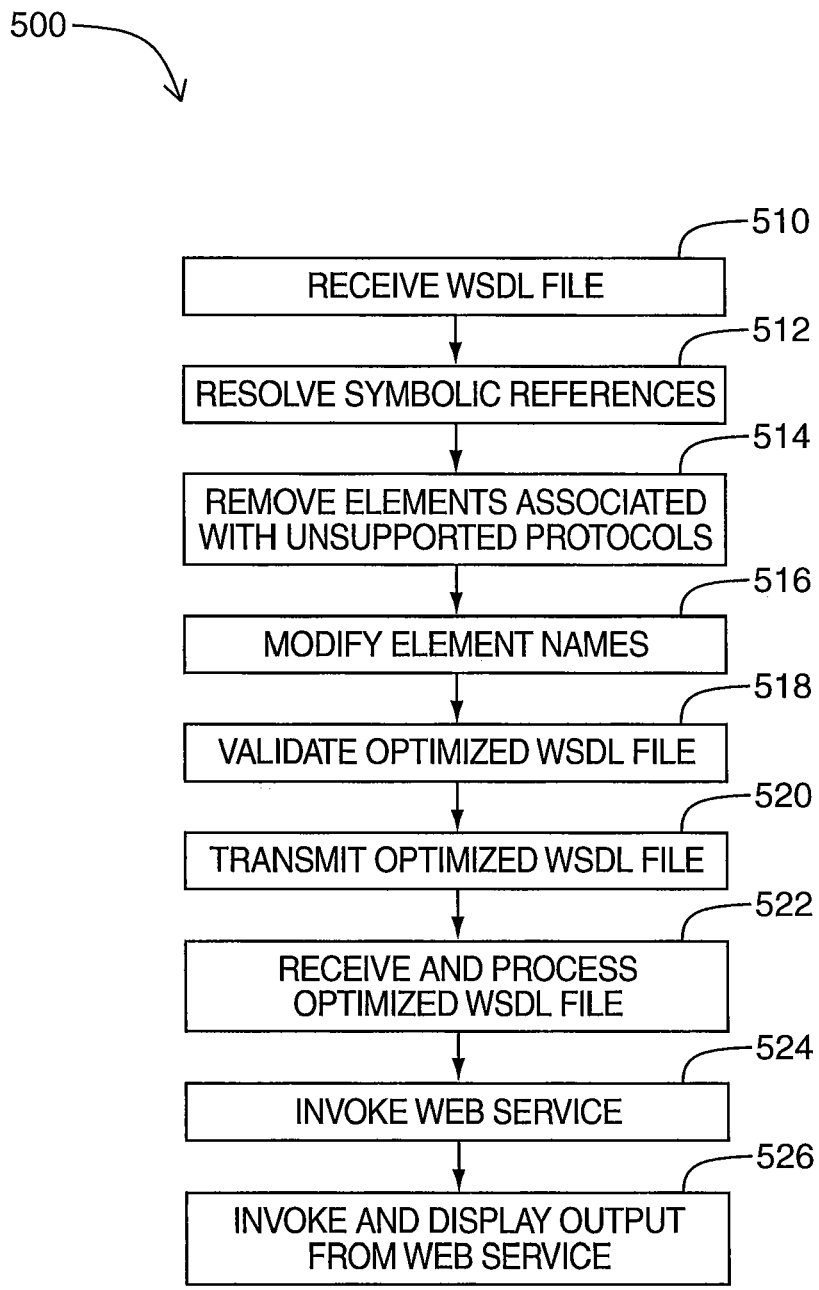
FIG. 5 is a flowchart illustrating a method of processing a web service description in an embodiment of the invention.

Referring to FIG. 5, a flowchart illustrating a method of processing a web service description so that the web service description is adapted for use with mobile device (e.g. mobile device 202 of FIG. 4B) in an embodiment of the invention is shown generally as 500.

In this embodiment of the invention, a web services accelerator (e.g. web services accelerator 415 of FIG. 4B) transforms standard web service protocols coming from a web server (e.g. web server 405 of FIG. 4B) into a wireless friendly form, in which the information that is required for a mobile device to consume a web service is minimized.

For example, a web service description in the form of a WSDL file may be optimized for mobile devices by the web services accelerator, and transmitted to the mobile device for subsequent use. Similarly, the web services accelerator may be adapted to translate data received from the mobile device into standard web service protocols. As the web services accelerator is adapted to handle standard web service protocols, existing web services may be made compatible for use with mobile devices, and a customized set of "wireless" web services need not be separately offered by web service providers.

At step 510, a web service description file (i.e. a WSDL file in this example) associated with a web service is received by the web services accelerator, as may be required to support one or more applications to be executed on the mobile device, for example. The WSDL file may be obtained from a location identified on the UDDI registry, for example. Other registry methods can also be used to locate the appropriate WSDL file including vendor specific registry protocols and human readable web based systems. The web services accelerator is preferably located on a remote computing device coupled to the mobile device, thereby offloading the task of processing the received WSDL file from the mobile device.

At step 512, parsing of the WSDL file is commenced by the web services accelerator, where symbolic references in the WSDL file are resolved in a forward direction to create an accelerator output file (i.e. an optimized WSDL file in this example), such that all of these symbolic references may be subsequently processed or parsed by the mobile device in a single pass. As standard WSDL has many symbolic references that may require holding the entire WSDL file in a memory to parse it, the creation of an optimized WSDL file that can be parsed in one pass requires less resources and processing on the mobile device. For example, step 512 may be facilitated by representing elements in the WSDL file as nodes in a graph, and reordering the nodes into a n-ary tree data structure, with the service element at its root.

At step 514, elements in the WSDL file associated with transport protocols not supported by the mobile device may also be optionally "deleted", by not including them in creating the optimized WSDL file. For example, if the mobile device will invoke web services only through SOAP calls, elements associated with other transport protocols will be deleted in creating the optimized WSDL file. This may result in a more compact accelerator output file that can be transmitted to the mobile device more quickly, and may require less memory to store.

At step 516, one or more names associated with elements in the WSDL file may optionally be modified in creating the optimized WSDL file. For example, elements may be renamed to eliminate the use of namespaces, such that shorter names may be used. More generally, longer names of elements may be replaced with shorter names. This may result in a more compact accelerator output file that can be transmitted to the mobile device more quickly, and may require less memory to store. Alternatively, a binary encoding scheme such as WAP Binary XML (WBXML) could be employed to reduce the size of the file. WBXML files are binary tokenized equivalents of XML files.

At step 518, the optimized WSDL file created in the processing at steps 512 through 516 by the web services accelerator of the WSDL file received at step 510 may be validated. Error handling and validation performed at this step ensure that the optimized WSDL file is a valid XML file, which can be subsequently parsed or processed by the mobile device. By performing this step before transmission of the validated optimized WSDL file to the mobile device, error handling and validation need not be performed by the mobile device (where it may not be performed as efficiently).

Alternatively, the WSDL file received at step 510 may be validated before parsing (e.g. before step 512), to avoid the processing of an invalid WSDL file.

At step 520, the optimized (and validated, if applicable) WSDL file is transmitted to the mobile device over a network connection.

At step 522, the optimized WSDL file is received by the mobile device, and processed by the mobile device by identifying the elements in the file that define inputs to the web service, the destination server (i.e. web server) of the web service, and a format for the inputs.

At step 524, the mobile device invokes the web service, by transmitting input data to the web service in the specified format. This step may be facilitated by receiving input data from a user of the mobile device through the user interface of an application executing on the mobile device.

At step 526, the mobile device receives output data from the web service in response to the invocation. The mobile device may then display the output data to a user of the mobile device through the user interface of an application executing on the mobile device.

To illustrate this embodiment of the invention by way of an example, consider the following WSDL file:

```
<?xml version="1.0" encoding="UTF-8"?>
<wsdl:definitions targetNamespace="http://rowen-websphere:8080/axis/Add.jws"
xmlns="http://schemas.xmlsoap.org/wsdl/"
xmlns:apachesoap="http://xml.apache.org/xml-soap" xmlns:impl="http://rowen-websphere:8080/axis/Add.jws"
xmlns:intf="http://rowen-websphere:8080/axis/Add.jws" xmlns:soapenc="http://schemas.xmlsoap.org/soap/encoding/"
```

-continued

```
xmlns:wsdl="http://schemas.xmlsoap.org/wsdl/" xmlns:wsdlsoap="http://schemas.xmlsoap.org/wsdl/soap/"
xmlns:xsd="http://www.w3.org/2001/XMLSchema"><wsdl:types/>
  <wsdl:message name="addRequest">
    <wsdl:part name="a" type="xsd:int"/>
    <wsdl:part name="b" type="xsd:int"/>
  </wsdl:message>
  <wsdl:message name="addResponse">
    <wsdl:part name="addReturn" type="xsd:int"/>
  </wsdl:message>
  <wsdl:portType name="Add">
    <wsdl:operation name="add" parameterOrder="a b">
      <wsdl:input message="impl:addRequest" name="addRequest"/>
      <wsdl:output message="impl:addResponse" name="addResponse"/>
    </wsdl:operation>
  </wsdl:portType>
  <wsdl:binding name="AddSoapBinding" type="impl:Add">
    <wsdlsoap:binding style="rpc" transport="http://schemas.xmlsoap.org/soap/http"/>
    <wsdl:operation name="add">
      <wsdlsoap:operation soapAction=""/>
      <wsdl:input name="addRequest">
        <wsdlsoap:body encodingStyle="http://schemas.xmlsoap.org/soap/encoding/" namespace="http://rowen-websphere:8080/axis/Add.jws" use="encoded"/>
      </wsdl:input>
      <wsdl:output name="addResponse">
        <wsdlsoap:body encodingStyle="http://schemas.xmlsoap.org/soap/encoding/" namespace="http://rowen-websphere:8080/axis/Add.jws" use="encoded"/>
      </wsdl:output>
    </wsdl:operation>
  </wsdl:binding>
  <wsdl:service name="AddService">
    <wsdl:port binding="impl:AddSoapBinding" name="Add">
      <wsdlsoap:address location="http://rowen-websphere:8080/axis/Add.jws"/>
    </wsdl:port>
  </wsdl:service>
</wsdl:definitions>
```

After the web services accelerator processes the description in accordance with an embodiment of the invention, the WSDL file may be converted into the following optimized WSDL file, which may be transmitted to the mobile device for further processing:

```
<?xml version="1.0" encoding="UTF-8"?>
<wsdl>
        <tp xmlns="" xmlns:soap="http://schemas.xmlsoap.org/wsdl/
          soap/"/>
        <s xmlns="" xmlns:soap="http://schemas.xmlsoap.org/wsdl/
soap/" n="AddService" a="http://rowen-websphere:8080/axis/Add.jws"
ns="http://rowen-websphere:8080/axis/Add.jws" n="Add">
                <op n="add" x="">
                        <i>
                                <p n="a" t="xsd:int"/>
                                <p n="b" t="xsd:int"/>
                        </i>
                        <o>
                                <p n="addReturn" t="xsd:int"/>
                        </o>
                </op>
        </s>
</wsdl>
```

Figure 6:
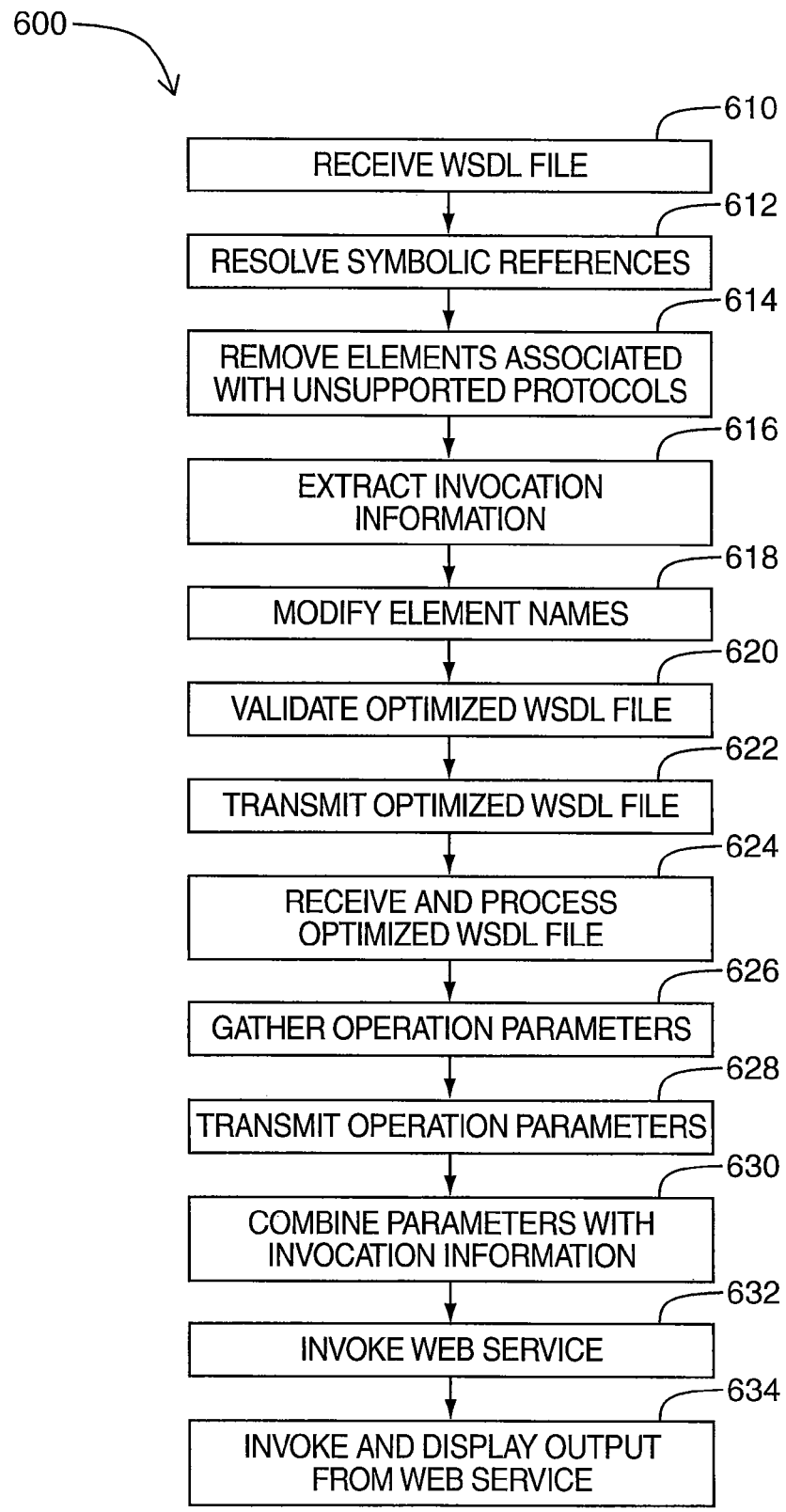
FIG. 6 is a flowchart illustrating a method of processing a web service description in another embodiment of the invention.

Referring to FIG. 6, a flowchart illustrating a method of processing a web service description so that the web service description is adapted for use with mobile device (e.g. mobile device 202 of FIG. 4B) in an embodiment of the invention is shown generally as 600.

In this embodiment of the invention, a web services accelerator (e.g. web services accelerator 415 of FIG. 4B) transforms standard web service protocols coming from a web server (e.g. web server 405 of FIG. 4B) into a wireless friendly form, in which the information that is required for a mobile device to consume a web service is minimized. In contrast to FIG. 5, invocation information is extracted from a web service description and retained by the web services accelerator. Information associated with a subsequent invocation of the web service is sent from the mobile device to the web services accelerator, and combined with the retained invocation information to be sent to the web service as a valid web service invocation. Results from the web services are returned to the web services accelerator, which produces a wireless-optimized message representing the result of the web service invocation for transmission to the mobile device.

Steps 610, 612, and 614 provide the same function as steps 510, 512, and 514 respectively in the description of FIG. 5.

At step 616, invocation information is extracted from the web service description received at step 610. Such invocation information includes information required to invoke the web service, which may include the location of the web service and the invocation method, for example. This invocation information is retained in the web services accelerator, and is not included in the creation of the optimized WSDL file to be sent to the mobile device.

Step 618, 620 and 622 provide the same function as steps 516, 518, and 520 respectively in the description of FIG. 5.

At step 624, the optimized WSDL file is received by the mobile device, and processed by the mobile device by identifying the elements in the file that define parameters required for a web service invocation, such as inputs to the web service, for example.

At step 626, the mobile device gathers operation parameters required to invoke the web service, as defined in the optimized WSDL file. This step may be facilitated by receiving data from a user of the mobile device through the user interface of an application executing on the mobile device.

At step 628, the operation parameters are transmitted by the mobile device to the web services accelerator.

At step 630, the operation parameters are combined with invocation information retained in the web services accelerator (e.g. at step 616) to generate input data for a web service invocation.

At step 632, the web services accelerator invokes the web service, by transmitting the input data to the web service.

At step 634, the web services accelerator receives output data from the web service in response to the invocation and transmits the output data to the mobile device. The mobile device may then display the output data to a user of the mobile device through the user interface of an application executing on the mobile device. The output data received from the web service may be optimized before it is sent to the mobile device, to reduce the amount of information that is transmitted to the mobile device.

Figure 7:
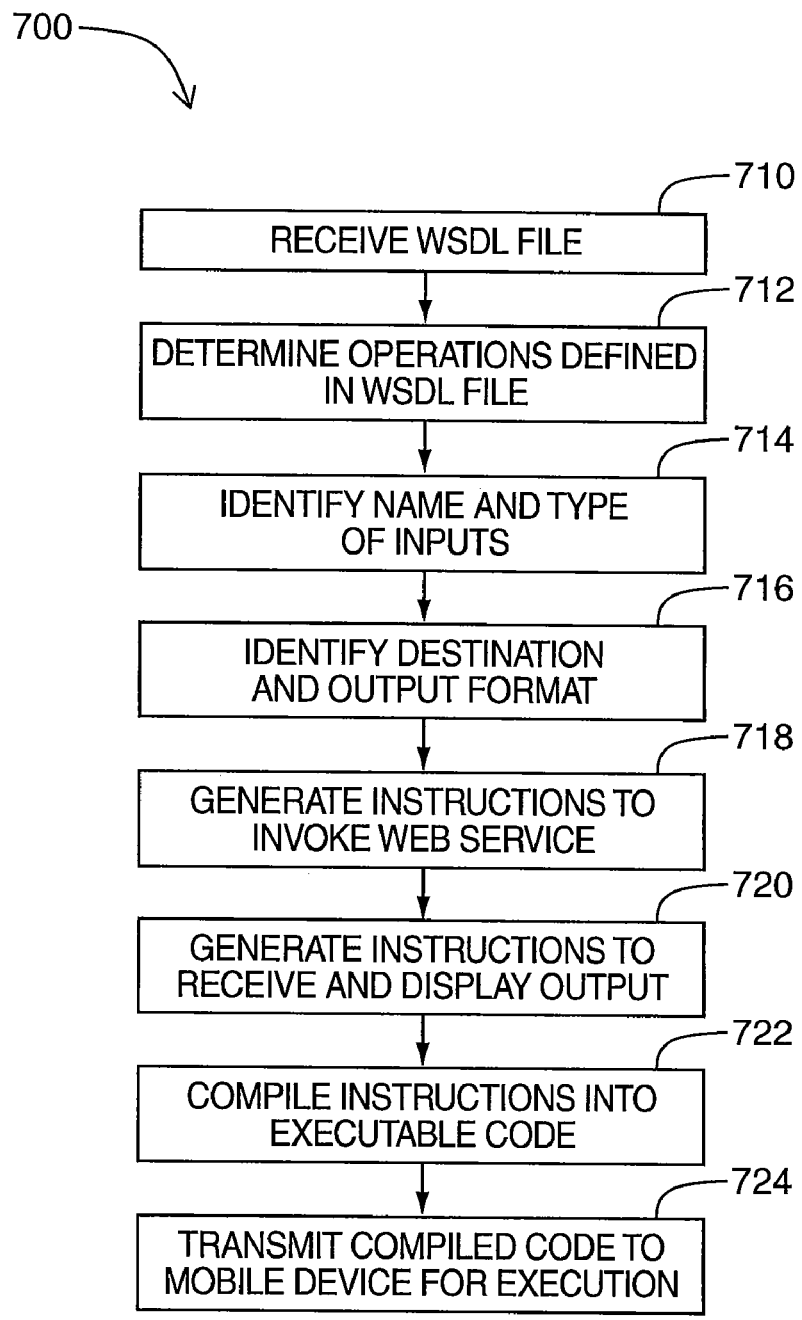
FIG. 7 is a flowchart illustrating a method of processing a web service description in another embodiment of the invention.

Referring to FIG. 7, a flowchart illustrating a method of processing a web service description so that the web service description is adapted for use with mobile device (e.g. mobile device 202 of FIG. 4B) in another embodiment of the invention is shown generally as 700.

In this embodiment of the invention, a web services accelerator (e.g. web services accelerator 415 of FIG. 4B) processes standard web service protocols coming from a web server (e.g. web server 405 of FIG. 4B) by generating code in a native language of the mobile device, thereby eliminating the need for an additional parser.

For example, a web service description in the form of a WSDL file may be used to generate an executable application in the form of Java code, which may then be executed on a mobile device adapted to execute Java applications. Accordingly, the mobile device need not be adapted to understand the standard web service protocols, and web service descriptions need not be transmitted to or processed by the mobile device. As the web services accelerator is adapted to handle standard web service protocols, existing web services may be made compatible for use with mobile devices, and a customized set of "wireless" web services need not be separately offered by web service providers.

Furthermore, in creating an accelerator output file in the form of an executable application, the application may also be programmed to generate a user interface to be displayed on the mobile device. The user interface may be used to obtain input data from the user of a mobile device to facilitate a web service invocation. The web services accelerator may be adapted to translate data received from the mobile device through the user interface into standard web service protocols. Output from the web service may also be displayed to the user through the user interface.

At step 710, a web service description file (i.e. a WSDL file in this example) associated with a web service is received by the web services accelerator as described with respect to step 510 of FIG. 5.

At step 712, parsing of the WSDL file is commenced by the web services accelerator, where all operations defined in the file are determined.

At step 714, the name, type and other formatting information associated with inputs to the web services are identified for each operation determined at step 712.

At step 716, other information including the destination (e.g. the web server) to which input data is to be sent when invoking the web service, and the format of the anticipated output by the web service, are also identified from the web service description.

At step 718, in the form of an application to facilitate the invocation of a web service, instructions in the Java programming language are generated based on the information obtained at previous steps of method 700. For example, the application may be programmed to display, in a user interface, entry fields to prompt a user for one or more of the inputs required to invoke the web service. The application will receive input data from a user of the mobile device, and checks the input data to confirm that they are of a valid type, as defined by the web service description. The application may also be programmed to obtain information related to the state of the mobile device or the mobile device environment. For example, information on the device's location may be retrieved and returned to the web service. When all requisite inputs have been received, the application may be programmed to automatically invoke the web service by transmitting the input data to the destination web server in the specified format.

At step 720, instructions may also be generated in the Java programming language to receive output data from the web service, in the format previously identified from the web service description, and to display the output data to a user in a user interface.

At step 722, the instructions produced at steps 718 and 720 are compiled into an accelerator output file in the form of Java bytecode by a Java compiler. Validation of the code may be integrated into this compilation step.

In variant embodiments of the invention, Java bytecode or other object code may be generated directly, without requiring the generation of instructions and subsequent compilation of these instructions.

At step 724, the application associated with the web service in the form of Java bytecode is transmitted to the mobile device, which may then be "processed" by executing the Java bytecode.

From the perspective of a user of the mobile device, web service applications may be downloaded upon request without requiring that a customized "wireless" version be available, as it is not necessary for a programmer to create a user interface specific to a selected web service where a web services accelerator is implemented. Accordingly, the invention may facilitate the automatic generation of client code in some embodiments.

Figure 8:
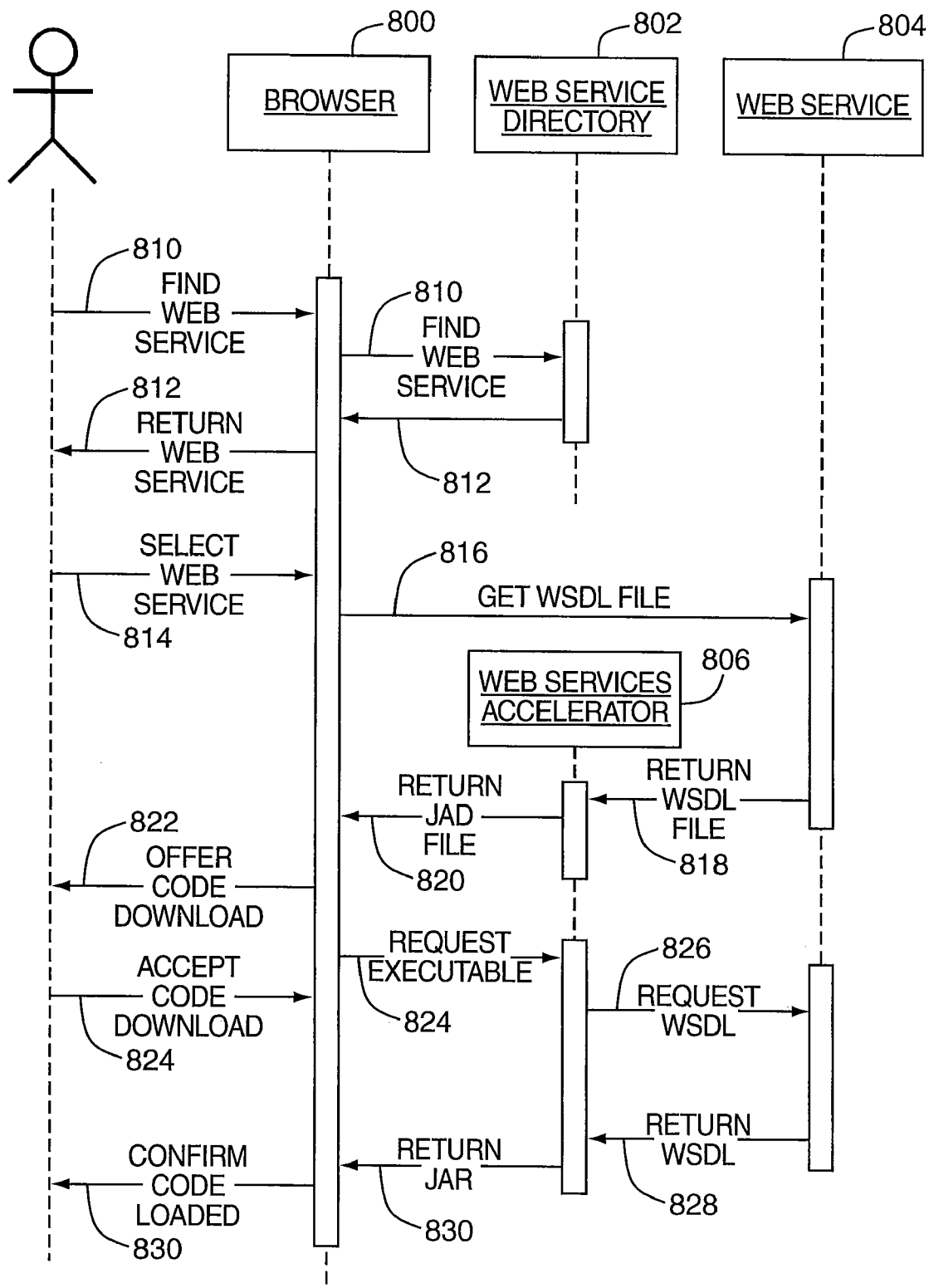
FIG. 8 is a logical flow diagram illustrating a process of automatically generating code in an embodiment of the invention.

Referring to FIG. 8, there is shown a logical flow diagram illustrating a process of automatically generating code in an embodiment of the invention in which a web services accelerator is adapted as a code generator (e.g. as described with reference to FIG. 6). The diagram illustrates the flow of data between a browser 800 operated by a user, a web service directory 802, a web service 804 (provided by a web service provider), and a web services accelerator 806, in an example implementation of an embodiment of the invention.

At 810, a user of a mobile device that is equipped with a browser 800 finds one or more web services through a web service directory 802.

At 812, information on one or more web services is returned to the user through browser 800.

At 814, the user may then select a specific web service 804 using information received through browser 800.

At 816, a first request is made for the web service description of the selected web service 804 in the form of a WSDL file from the web service provider.

At 818, a WSDL file associated with the selected web service 804 is returned to the web services accelerator 806.

At 820, the web services accelerator 806 returns a Java Application Descriptor (.jad) file associated with the selected web service to the browser 800.

At 822, the user is prompted to decide whether to download a Java application associated with the selected web service 804.

At 824, the user accepts the download and an executable file (e.g. in a Java Archive (.jar) format) is requested by browser 800.

At 826, a second request is made for the web service description in the form of a WSDL file of the selected web service 804 from the web service provider by the web services accelerator 806, to ensure that the web service description being considered by the web services accelerator 806 is current.

At 828, the WSDL file associated with the selected web service 804 is returned to the web services accelerator 806.

At 830, an executable Java application is created by the web services accelerator 806 (e.g. as described with reference to FIG. 7) and returned to the user through browser 800. Confirmation of receipt of the application by the mobile device may be displayed to the user when the download is complete.

In variant embodiments of the invention, support for web services may be integrated into a web browser of the mobile device. In these embodiments, the web services accelerator may be adapted to produce a browser plug-in module for supporting a particular web service, rather than a separate stand-alone application.

While the accelerator output file is in the form of an executable Java application in one example implementation of this embodiment of the invention, the accelerator output file may be based on different languages or be of a different form in other implementations of the invention.

Although the mobile device invokes the web service directly in the embodiment of the invention described with reference to the examples of FIG. 5 and FIG. 7, in variant embodiments of the invention, the mobile device may instead invoke the web service indirectly by transmitting information (e.g. operation parameters) and/or a request to the web services accelerator to invoke the web service, as described with reference to FIG. 6, for example. Where the web services accelerator is adapted to invoke the web service on behalf of the mobile device, the accelerator output file created and transmitted by the web services accelerator to the mobile device may be made even more compact, as the mobile device will require even less information to initiate a web service invocation.

Similarly, in variant embodiments of the invention, output from web services may be received by the web services accelerator and retransmitted (with modifications, if desired) to the mobile device, rather than the output being received directly by the mobile device. Moreover, in variant embodiments of the invention, the web services accelerator may be adapted to monitor one or more web services for changes in the output, and to "push" such changes to the mobile device. By adapting the web services accelerator in this manner, synchronous "pull" operations may be converted into asynchronous "push" operations. Due to certain typical characteristics of wireless networks (e.g. low bandwidth, intermittent connectivity), asynchronous applications typically provide for an improved user experience, when compared to synchronous applications. When asynchronous applications are used, users of a mobile device may access up-to-date data stored locally on the mobile device, while being shielded from the effects of network latency and bandwidth limitations. This feature may also be offered as a subscription to users, if desired.

In variant embodiments of the invention, the web services accelerator may also perform processing on files or messages related to other protocols. For example, UDDI queries (or queries made of other directory or registry systems) may be made by the web services accelerator and information obtained from UDDI registries (or other directory or registry systems) may be processed by the web services accelerator before it is transmitted to the mobile device.

In variant embodiments of the invention, instructions for performing the steps of a method of processing a web service description in an embodiment of the invention may be stored on computer-readable media, which may include physical or transmission-type media, for example.

The invention has been described with regard to a number of embodiments. However, it will be understood by persons skilled in the art that other variants and modifications may be made without departing from the scope of the invention as defined in the claims appended hereto.

The invention claimed is:

1. A method of processing a web service description so that said web service description is adapted for use with a mobile device, said web service description comprising a plurality of web service description elements, wherein said method is performed at a computing device remotely coupled to the mobile device, said method comprising:

receiving a first web service description file comprising said web service description, wherein said web service description defines an interface to a web service;

creating at least one accelerator output file from said web service description, said creating comprising optimizing said web service description for said mobile device;

wherein said at least one accelerator output file comprises a second web service description file, said second web service description file comprising an optimized web service description adapted for processing by said mobile device;

and transmitting said at least one accelerator output file to said mobile device, wherein said at least one accelerator output file facilitates invocations of said web service by said mobile device;

wherein said optimizing comprises resolving symbolic references in said web service description of said first web service description file such that said at least one accelerator output file is parseable by said mobile device in one pass;

and wherein said resolving comprises representing the plurality of web service description elements as nodes in a graph, re-ordering the nodes into a tree data structure so that said symbolic references are resolved in a forward direction, and creating said at least one accelerator output file from said tree data structure;

wherein each of a subset of said plurality of web service description elements is associated with transport protocols not supported by said mobile device, and wherein said optimizing further comprises identifying said subset, and excluding said subset from said at least one accelerator output file.

2. The method of claim 1, wherein both said web service description of said first web service description file and said optimized web service description of said second web service description file are in Web Service Description Language.

3. The method of claim 1, wherein invocations of the web service by the mobile device are performed in accordance with a Simple Object Access Protocol.

4. The method of claim 1, wherein said optimizing further comprises modifying one or more names associated with each of one or more web service description elements.

5. The method of claim 1, further comprising validating said at least one accelerator output file.

6. The method of claim 1, further comprising processing said at least one accelerator output file by identifying web service description elements that define inputs to said web service, a destination, and a format for said inputs from said optimized web service description.

7. The method of claim 6, further comprising invoking said web service by transmitting input data to said destination in said format.

8. The method of claim 7, further comprising receiving output data from said web service in response to said invoking.

9. The method of claim 1, wherein said optimizing further comprises extracting invocation information from said web service description, and storing said invocation information.

10. The method of claim 9, further comprising processing said at least one accelerator output file by identifying web service description elements that define inputs to said web service and obtaining operation parameters based on said inputs.

11. The method of claim 10, further comprising generating input data by combining said operation parameters with said invocation information.

12. The method of claim 11, further comprising invoking said web service by transmitting said input data to said web service.

13. The method of claim 12, further comprising receiving output data from said web service in response to said invoking.

14. The method of claim 1, wherein said at least one accelerator output file comprises code adapted for execution on said mobile device, for obtaining input data used to invoke said web service, and for invoking said web service using said input data.

15. The method of claim 14, wherein said creating comprises:
  identifying web service description elements that define inputs to said web service from said web service description;
  producing first instructions for generating a user interface to prompt a user for one or more of said inputs to said web service;
  producing second instructions for obtaining input data associated with said one or more inputs;
  identifying web service description elements that define a destination and a format for said inputs to said web service; and
  producing third instructions for invoking said web service by transmitting said input data to said destination in said format.

16. The method of claim 15, wherein said creating further comprises:
  identifying web service description elements that define outputs from said web service in response to invocations of said web service and a format for said outputs from said web service description; and
  producing fourth instructions for receiving output data in said format from said web service.

17. The method of claim 16, wherein said creating further comprises:
  producing fifth instructions for outputting output data received from said web service to said user.

18. The method of claim 14, wherein said creating further comprises compiling instructions produced at said creating into said code.

19. The method of claim 18, wherein said code represents an executable Java application.

20. The method of claim 14, further comprising processing said at least one accelerator output file by executing said code.

21. A web services accelerator comprising a processor, which resides on a computing device in a network in which said computing device is coupled to a mobile device, wherein said processor is configured to perform a method of processing a web service description so that said web service description is adapted for use with said mobile device, said web service description comprising a plurality of web service description elements, said method comprising:
  receiving a first web service description file comprising said web service description, wherein said web service description defines an interface to a web service;
  creating at least one accelerator output file from said web service description, said creating comprising optimizing said web service description for said mobile device, wherein said at least one accelerator output file comprises a second web service description file, said second web service description file comprising an optimized web service description adapted for processing by said mobile device;
  and transmitting said at least one accelerator output file to said mobile device, wherein said at least one accelerator output file facilitates invocations of said web service by said mobile device;
  wherein said optimizing comprises resolving symbolic references in said web service description of said first web service description file such that said at least one accelerator output file is parseable by said mobile device in one pass;
  and wherein said resolving comprises representing the plurality of web service description elements as nodes in a graph, re-ordering the nodes into a tree data structure so that said symbolic references are resolved in a forward direction, and creating said at least one accelerator output file from said tree data structure;
  wherein each of a subset of said plurality of web service description elements is associated with transport protocols not supported by said mobile device, and wherein said optimizing further comprises identifying said subset, and excluding said subset from said at least one accelerator output file created at said creating.

22. The web services accelerator comprising the processor of claim 21, wherein both said web service description of said first web service description file and said optimized web service description of said second web service description file are in Web Service Description Language.

23. The web services accelerator comprising the processor of claim 21, wherein invocations of the web service by the mobile device are performed in accordance with a Simple Object Access Protocol.

24. The web services accelerator comprising the processor of claim 21, wherein said optimizing further comprises modifying one or more names associated with each of one or more web service description elements.

25. The web services accelerator comprising the processor of claim 21, wherein said method further comprises validating said at least one accelerator output file.

26. The web services accelerator comprising the processor of claim 21, wherein said optimizing comprises extracting invocation information from said web service description, and storing said invocation information.

27. The web services accelerator comprising the processor of claim 26, wherein said method further comprises obtaining operation parameters based on said inputs from said mobile device.

28. The web services accelerator comprising the processor of claim 27, wherein said method further comprises generating input data by combining said operation parameters with said invocation information.

29. The web services accelerator comprising the processor of claim 28, wherein said method further comprises invoking said web service by transmitting said input data to said web service.

30. The web services accelerator comprising the processor of claim 29, wherein said method further comprises receiving output data from said web service in response to said invoking.

31. The web services accelerator comprising the processor of claim 30, wherein said method further comprises transmitting at least a subset of said output data to said mobile device.

32. The web services accelerator comprising the processor of claim 21, wherein said method further comprises receiving input data from said mobile device and invoking said web service by transmitting said input data to said web service.

33. The web services accelerator comprising the processor of claim 32, wherein said method further comprises receiving output data from said web service in response to said invoking and transmitting said output data to said mobile device.

34. The web services accelerator comprising the processor of claim 33, wherein said method further comprises detecting changes to said output data from said web service in response to said invoking and transmitting said changes to said mobile device.

35. The web services accelerator comprising the processor of claim 21, wherein said at least one accelerator output file comprises code adapted for execution on said mobile device, wherein said code comprises instructions for obtaining input data used to invoke said web service, and for invoking said web service using said input data.

36. The web services accelerator comprising the processor of claim 35, wherein said creating comprises:
    identifying web service description elements that define inputs to said web service from said web service description;
    producing first instructions for generating a user interface to prompt a user for one or more of said inputs to said web service;
    producing second instructions for obtaining input data for said one or more inputs;
    identifying web service description elements that define a destination and a format for said inputs to said web service; and
    producing third instructions for invoking said web service by transmitting input data to said destination in said format.

37. The web services accelerator comprising the processor of claim 36, wherein said third instructions comprise instructions for receiving said input data from said mobile device and transmitting said input data to said web service.

38. The web services accelerator comprising the processor of claim 37, wherein said creating further comprises:
    identifying web service description elements that define outputs from said web service in response to invocations of said web service and a format for said outputs from said web service description; and
    producing fourth instructions for receiving output data in said format from said web service.

39. The web services accelerator comprising the processor of claim 38, wherein said creating further comprises:
    producing fifth instructions for outputting output data received from said web service to said user.

40. The web services accelerator comprising the processor of claim 39, wherein said fifth instructions comprise instructions for receiving said output data from said web services and for transmitting said output data to said mobile device.

41. The web services accelerator comprising the processor of claim 40, wherein said method further comprises detecting changes to said output data from said web service in response to said invoking and transmitting said changes to said mobile device.

42. The web services accelerator comprising the processor of claim 29, wherein said creating further comprises compiling instructions produced at said creating into said code.

43. The web services accelerator comprising the processor of claim 29, wherein said code represents an executable Java application.

44. A storage media comprising program instructions which are executable at a computing device remotely coupled to a mobile device, to implement a method of processing a web service description so that said web service description is adapted for use with said mobile device, said web service description comprising a plurality of web service description elements, said method comprising:
    receiving a first web service description file comprising said web service description, wherein said web service description defines an interface to a web service;
    creating at least one accelerator output file from said web service description, said creating comprising optimizing said web service description for said mobile device, wherein said at least one accelerator output file comprises a second web service description file, said second web service description file comprising an optimized web service description adapted for processing by said mobile device;
    and transmitting said at least one accelerator output file to said mobile device, wherein said at least one accelerator output file facilitates invocations of said web service by said mobile device;
    wherein said optimizing comprises resolving symbolic references in said web service description of said first web service description file such that said at least one accelerator output file is parseable by said mobile device in one pass;
    and wherein said resolving comprises representing the plurality of web service description elements as nodes in a graph, re-ordering the nodes into a tree data structure so that said symbolic references are resolved in a forward direction, and creating said at least one accelerator output file from said tree data structure;
    wherein each of a subset of said plurality of web service description elements is associated with transport protocols not supported by said mobile device, and wherein said optimizing further comprises identifying said subset, and excluding said subset from said at least one accelerator output file.

* * * * *

UNITED STATES PATENT AND TRADEMARK OFFICE
CERTIFICATE OF CORRECTION

PATENT NO. : 7,596,622 B2 Page 1 of 1
APPLICATION NO. : 10/786004
DATED : September 29, 2009
INVENTOR(S) : Owen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1199 days.

Signed and Sealed this

Twenty-eighth Day of September, 2010

David J. Kappos
*Director of the United States Patent and Trademark Office*